Oct. 3, 1933.    E. E. PAINE ET AL    1,928,867
FLOOR COVERING FOR AUTOMOBILES AND THE LIKE
Filed Sept. 28, 1931
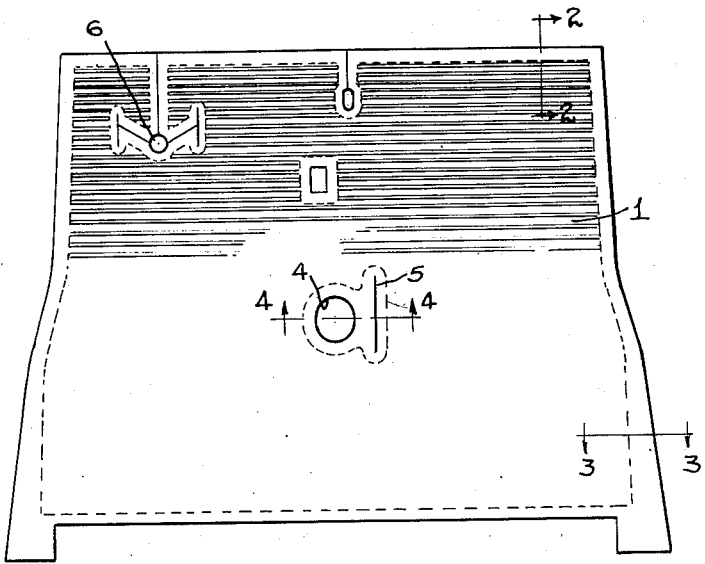
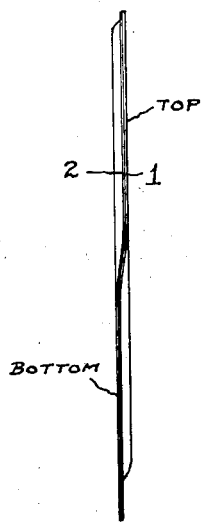
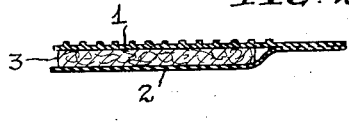
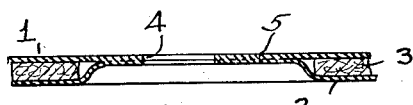
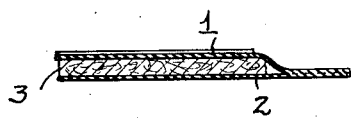
INVENTORS
Enoch E. Paine 2d
BY William S. Vrooman
Fay, Oberlin & Fay
ATTORNEYS.

Patented Oct. 3, 1933

1,928,867

UNITED STATES PATENT OFFICE 1,928,867

FLOOR COVERING FOR AUTOMOBILES AND THE LIKE

Enoch E. Paine, Cleveland Heights, and William S. Vrooman, Cleveland, Ohio, assignors to The Paine & Williams Company, Cleveland, Ohio, a corporation of Ohio Application September 28, 1931
Serial No. 565,552

3 Claims. (Cl. 154—49)

In U. S. Patent No. 1,715,525, granted under date of June 4, 1929, to one of the present applicants, there is disclosed a covering for floors and the like comprising a resilient fibrous base and an upper wearing layer of rubber, such covering being particularly designed for use in automobiles in place of a plain rubber mat or piece of carpet such as had theretofore been ordinarily used. While such improved cover has been found highly satisfactory and has gone into extensive commercial use, it has become desirable in modern automobile design to eliminate, as far as possible, the transmission of heat from the power plant to the passenger compartments and particularly the one in which the driver of the automobile is seated. This is particularly true in the case of closed cars, which are the prevailing type, and has become more important with the increased use of such cars for traveling long distances and at relatively high speeds, under which conditions not only is more heat generated, but the engine and associated parts are frequently operated at maximum temperatures for a long time.

The present improved covering accordingly has as a principal object to more completely insulate the passenger compartments of an automobile from transmission of heat through the floor. At the same time a covering of increased softness to the tread and capable of being fitted more closely to the compartment and any operating levers or the like that may project through the floor is obtained.

To the accomplishment of the foregoing and related ends, the invention, then, consists of the means hereinafter fully described and particularly pointed out in the claims, the annexed drawing and the following description setting forth in detail certain structure embodying the invention, such disclosed means constituting, however, but one of various mechanical forms in which the principle of the invention may be used.

In said annexed drawing:—

Fig. 1 is a plan view of an embodiment of our invention as adapted for an automobile; Figs. 2, 3 and 4 are detail sections on a somewhat larger scale taken on planes respectively indicated by the lines 2—2, 3—3 and 4—4, Fig. 1; and Fig. 5 is a side elevation of the complete mat as viewed from the left in Fig. 1.

Essentially the present improved floor covering comprises two sheets of vulcanized rubber, an upper sheet 1 constituting the upper layer or wearing surface and a lower sheet 2 being designed to contact directly with the floor board, in the case of an automobile, or with other floor surface to which the covering or mat may be applied, and between such top and bottom layers of rubber, an interposed filler layer 3 of fibrous material, which however while of the same contour is of lesser area than such rubber sheets or layers, so that its edges terminate short of the latter. This is true not only of the outer edges of the covering but of the edges that bound openings such as openings 4, 5 and 6, through which the gear shift lever, steering column, etc., may project.

The overlapping edges of the two rubber layers are then vulcanized or cemented together not only around the outside of the covering or mat, but also around such openings, so that a body of air is more or less permanently entrapped between the layers.

The top layer 1 is preferably made of soft vulcanized rubber with ribbing, ornamental figuring or designs of any desired character molded thereon. The bottom layer 2 will preferably be substantially lighter, i. e., of less thickness, than such top layer and may be made of cheaper material since it will ordinarily be subjected to practically no wear in use.

The fibrous filler layer 3 will be of such thickness as to impart a soft yielding tread effect to the covering. It may be made of ordinary felt, preferably a loosely compacted felt, or of a hair felt, preferably of a rather coarse type, such for instance as cattle hair, or of cotton batting, or the like. Also, if found desirable, special types of fiber mats such as so-called "stitched" mats may be employed wherein the felt or hair is attached to a fabric sheet, such as a loosely woven sheet of burlap, by passing threads through the two or by punching the layer of felt or hair at intervals through the sheet of fabric so as to cause the two to adhere together in more or less permanent fashion. Where such stitched type of mat is employed and the stitching is arranged in parallel lines, the latter will preferably lie, in case the covering is to be used in an automobile, transversely of the compartment to which the covering is fitted, so that such covering may be more readily flexed to accommodate itself to an inclined floor board or the like.

As previously stated, the top and bottom layers of rubber are vulcanized or cemented together at their edges so as entirely to enclose the fibrous mat just described as constituting the intermediate or filler layer of the cover. In addition, the upper rubber layer may be cemented to the contacting upper surface of the filler layer, if desired, in order both to prevent the latter, where of loose texture, from shifting its position in use and to insure a smooth effect to the rubber layer.

The vulcanizing or cementing of the edges of the rubber layers may be effected either in the normal plane of the lower layer or that of the upper layer or in an intermediate plane. Where, however, the covering is designed for use in an automobile, it will be desirable, as illustrated, that those margin portions which come in contact with a wall of the compartment should thus be united in the plane of the upper rubber layer so that the formation of a pocket or groove between the covering and the wall will be avoided. This is the construction illustrated in Fig. 2. On the contrary, at the door openings and to meet other similar conditions, it is desirable that the edges in question be brought together in the plane of the lower rubber layer so that at these points the margin of the covering will contact closely with the floor surface. This is the construction illustrated in Fig. 3. As shown in Fig. 4, the edges of the top and lower rubber layers where united around an opening in the covering provide a grommet effect so that the edges will closely fit a movable lever or the like projecting through such opening and thus reduce to a minimum the flow of air through such openings.

It has been found by actual test that a covering constructed as aforesaid eliminates to a surprising degree and much more effectively, for example, than an ordinary rubber mat, or even a mat backed with a fibrous base as described in the aforesaid Patent No. 1,715,525, the passage of heat through the floor in an automobile compartment or another situation where the floor itself is liable to become heated. In other words, the entrapment of a body of air along with the fibrous layer not only imparts a desirable degree of softness to the upper rubber layer, but effectively checks the transmission of heat from the bottom layer to such upper layer. Furthermore, the unique manner in which the edges of the two rubber layers are united insures against heated currents of air escaping from below the covering into the compartment, to the floor of which such covering is applied.

It will be understood that the body or air between the two rubber layers is not necessarily so closely confined as to constitute an air cushion of the covering, this being unnecessary since the fibrous filler layer normally serves to maintain the upper and lower rubber layers at a sufficient distance apart, and such fibrous layer is itself filled with air owing to the looseness of its texture.

Indeed a satisfactory covering, even from the standpoint of preventing transmission of heat therethrough, is obtained where the upper layer instead of being made of rubber is made of more or less closely woven carpet material. A sufficient body of air will still be held in the fibrous filler layer to give a very considerable insulating effect in addition to that which the material of the filler layer may itself have, while the bottom layer of rubber, being impenetrable to currents of air, will eliminate the transmission of heat except by conduction.

The construction also permits of the use of a much softer fibrous material in association with a rubber tread layer than is possible with such previously patented floor mat inasmuch as such fibrous material, constituting, as it does, an intermediate layer, is protected against wear and disintegration. The complete enclosure of such fibrous layer between the upper and lower rubber layers furthermore prevents objectionable "whiskering", i. e., the projection and separation of detached fibers or hairs from a fibrous layer or mat as heretofore used in floor coverings. Finally not only does the present improved covering, as stated above, serve to prevent transmission of heat through the floor, but it effectively prevents the transmission of sound and absorbs vibration to the vastly increased comfort and "leg-ease" of driver or passenger in the case of an automobile.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. A covering for floors and the like, comprising a bottom layer of substantially impervious material, an intermediate layer of fibrous material, and an upper wearing layer, the edges of said bottom and upper layers extending beyond said intermediate layer and being secured together to form a flexible margin lying in different planes.

2. A covering for floors and the like, comprising a bottom layer of substantially impervious material, an intermediate layer of fibrous material, and an upper wearing layer, the edges of said bottom and upper layers extending beyond said intermediate layer and being secured together to form a flexible margin, one portion whereof lies substantially in the plane of said bottom layer and another portion substantially in the plane of said upper layer.

3. A covering for floors and the like, comprising a bottom layer of rubber, an intermediate layer of resilient fibrous material, and an upper layer of rubber, the edges of said rubber layers extending beyond said intermediate layer and being secured together to confine a body of air therebetween and to form a flexible margin about the covering with one portion of such margin lying substantially in the plane of said bottom layer and another portion substantially in the plane of said top layer.

ENOCH E. PAINE.
WILLIAM S. VROOMAN.